United States Patent
Hansen

(10) Patent No.: US 6,402,091 B1
(45) Date of Patent: Jun. 11, 2002

(54) FLOW-THROUGH THRUST TAKEOUT APPARATUS

(75) Inventor: William E. Hansen, Sacramento, CA (US)

(73) Assignee: Aerojet-General Corporation, Sacramento, CA (US)

( * ) Notice: Subject to any disclaimer, the term of this patent is extended or adjusted under 35 U.S.C. 154(b) by 0 days.

(21) Appl. No.: 09/541,176

(22) Filed: Apr. 3, 2000

(51) Int. Cl.[7] .............................................. B64C 15/04
(52) U.S. Cl. ..................................... 244/52; 239/265.35
(58) Field of Search ..................... 239/265.35, 269.19; 60/230, 269, 451, 538; 244/172, 12.1, 23 R, 23 A, 12.5, 230, 52

(56) References Cited

U.S. PATENT DOCUMENTS

| | | | |
|---|---|---|---|
| 2,959,374 A | * 11/1960 | Laskowitz | 244/52 |
| 3,004,734 A | * 10/1961 | Radford | 60/230 |
| 3,049,877 A | 8/1962 | Sherman | 60/35.55 |
| 3,167,086 A | 1/1965 | Michalski | 137/315 |
| 3,237,890 A | * 3/1966 | Thielman | 244/52 |
| 3,308,848 A | 3/1967 | Johnson et al. | 137/615 |
| 3,401,887 A | * 9/1968 | Sheppard | 239/265.35 |
| 3,912,172 A | * 10/1975 | Bolner | 239/265.35 |
| 4,157,788 A | * 6/1979 | Canfield et al. | 244/3.22 |
| 4,318,271 A | 3/1982 | Doukakis et al. | 60/232 |
| 4,372,344 A | 2/1983 | Stafford | 137/615 |
| 4,671,543 A | 6/1987 | Miliezky | 285/270 |
| 4,892,253 A | 1/1990 | Speicher et al. | 239/265.35 |
| 5,760,509 A | 6/1998 | Chung | 310/90 |

* cited by examiner

Primary Examiner—Galen L. Barefoot
(74) Attorney, Agent, or Firm—Townsend and Townsend and Crew LLP

(57) ABSTRACT

A flow-through thrust takeout apparatus comprises an injection manifold (coupler) mounted to an engine and having a manifold passage. A ball line is attached to the injection manifold, and has a ball line passage fluidicly coupled with the manifold passage. A ball clamp is movably connected with the exterior surface of the ball line. A tank interface is attached to the ball clamp. The tank interface and ball clamp form a socket around the ball line to be movable relative to the injection manifold and the ball line. The tank interface is attached to a fuel tank. The interface member has an interface passage fluidicly coupled with the ball line passage to permit fuel flow from the fuel tank to the engine. A valve is mounted between the engine and the interface passage, and is adjustable to control fluid flow between the tank and the engine. The apparatus transfers the engine thrust from the rocket engine to the fuel tank, and the flow-through passages permit fuel transfer from the fuel tank to the engine.

20 Claims, 3 Drawing Sheets

FLOW-THROUGH THRUST TAKEOUT APPARATUS

BACKGROUND OF THE INVENTION

This invention relates generally to rockets and, more particularly, to an integrated apparatus for connecting a fuel tank to a rocket engine to facilitate delivery of fuel and provide thrust takeout.

In a conventional rocket, a flow conduit is coupled between the rocket engine and the fuel tank to allow delivery of fuel from the fuel tank to the engine. A separate thrust takeout structure is provided to transfer the engine thrust from the engine to the fuel tank side web. Such a design results in a complicated assembly with many components and high manufacturing costs.

SUMMARY OF THE INVENTION

The present invention is directed to a thrust takeout structure that transfers the engine thrust from the rocket engine to the fuel tank and includes a flow-through feature for transferring fuel from the fuel tank to the engine. The invention does so by providing a thrust takeout gimbal assembly that includes a flow-through ball and socket joint. One or more thrust vector control actuators are used to adjust the gimbal assembly to orient the fuel tank relative to the engine for thrust takeout. The ball and socket joint includes a flow path that permits flow between the fuel tank and the engine for the range of movement of the gimbal assembly. The assembly desirably includes a valve that can be opened and closed to control fuel delivery from the fuel tank to the engine via the ball and socket joint. The integrated flow-through thrust takeout apparatus is compact and lower in weight, and has fewer parts. The manufacturing cost is reduced.

In accordance with an aspect of the present invention, a flow-through thrust takeout apparatus comprises a coupler having a coupler passage. A ball line is attached to the coupler, and has a ball line passage fluidicly coupled with the coupler passage. A ball clamp is movably connected with the exterior surface of the ball line. An interface member is attached to the ball clamp to be movable relative to the coupler and the ball line. The interface member has an interface passage fluidicly coupled with the ball line passage.

In some embodiments, a pair of thrust vector actuators are coupled between the interface member and the coupler. The actuators are actuatable to adjust the position of the interface member relative to the coupler. The interface member may be a tank interface connected to a fuel tank. The coupler may be an injection manifold mounted to a rocket engine.

In accordance with another aspect of the invention, a flow-through load transfer apparatus comprises a coupler having a coupler passage. A valve is connected with the injector coupler, and has a valve passage fluidicly coupled with the coupler passage. A ball is connected with the valve, and has a ball passage extending therethrough. The ball passage is fluidicly coupled with the valve passage. A socket has an interior surface movably coupled to the exterior surface of the ball. An actuator may be operatively coupled with the valve for controlling the valve.

In accordance with another aspect of the invention, a flow-through load transfer apparatus comprises a coupler having a coupler passage. A ball is connected with the coupler, and has a ball passage extending therethrough. The ball passage is fluidicly coupled with the coupler passage. A socket has an interior surface movably connected with the exterior surface of the ball. A portion of the interior surface of the socket is spaced from the exterior surface of the ball by a socket spacing. A seal is disposed in the socket spacing between the exterior surface of the ball and the inner surface of the socket.

In some embodiments, a bearing is disposed in the socket spacing between the exterior surface of the ball and the interior surface of the socket. The bearing is typically disposed between the seal and the ball passage. Gaps may be present between the bearing and at least one of the interior surface of the socket and the exterior surface of the ball to permit fluid flow therethrough for lubrication.

DESCRIPTION OF THE SPECIFIC EMBODIMENTS

Figure 1:
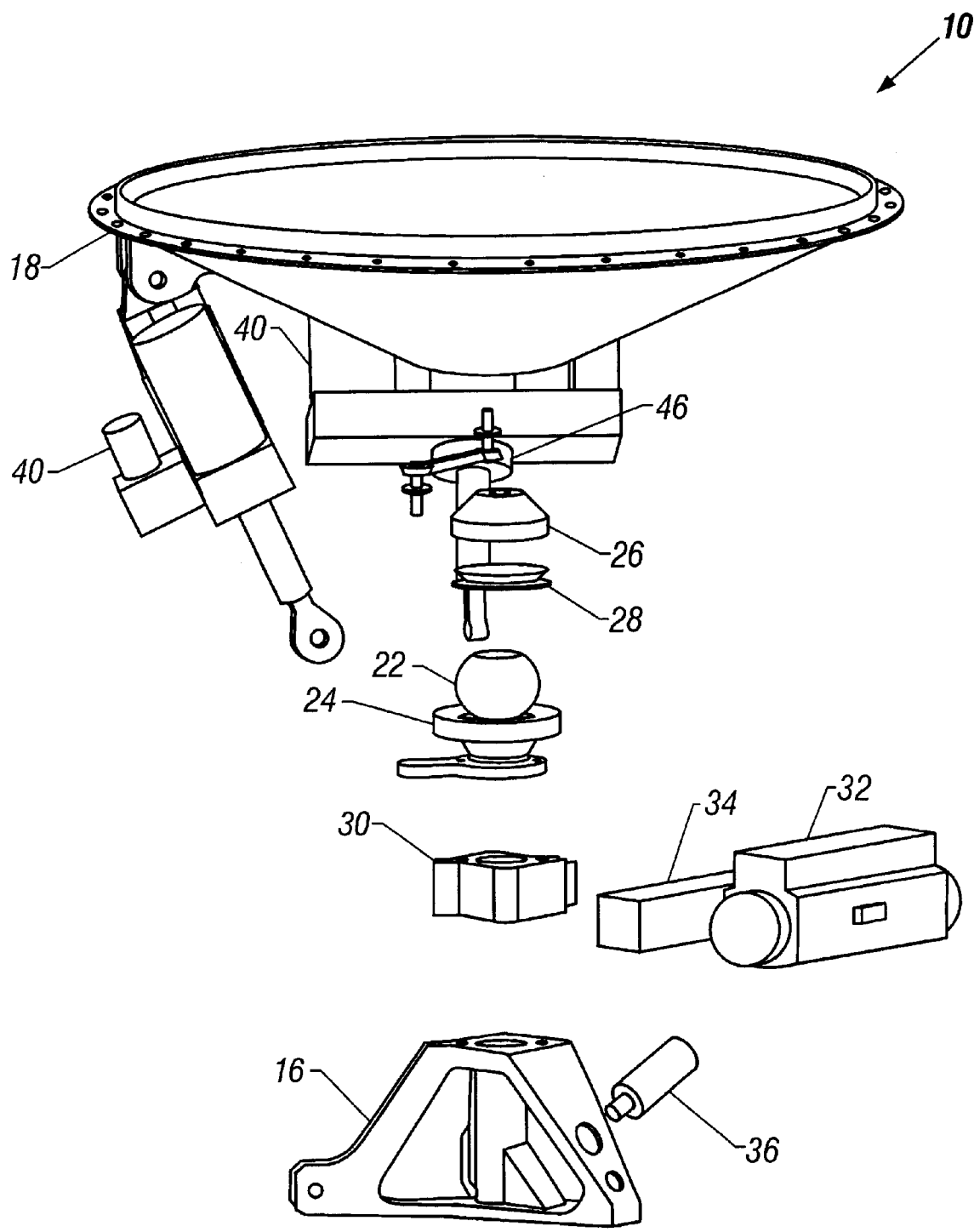
FIG. 1 is an exploded perspective view of the flow-through thrust takeout apparatus according to an embodiment of the present invention.
Figure 2:
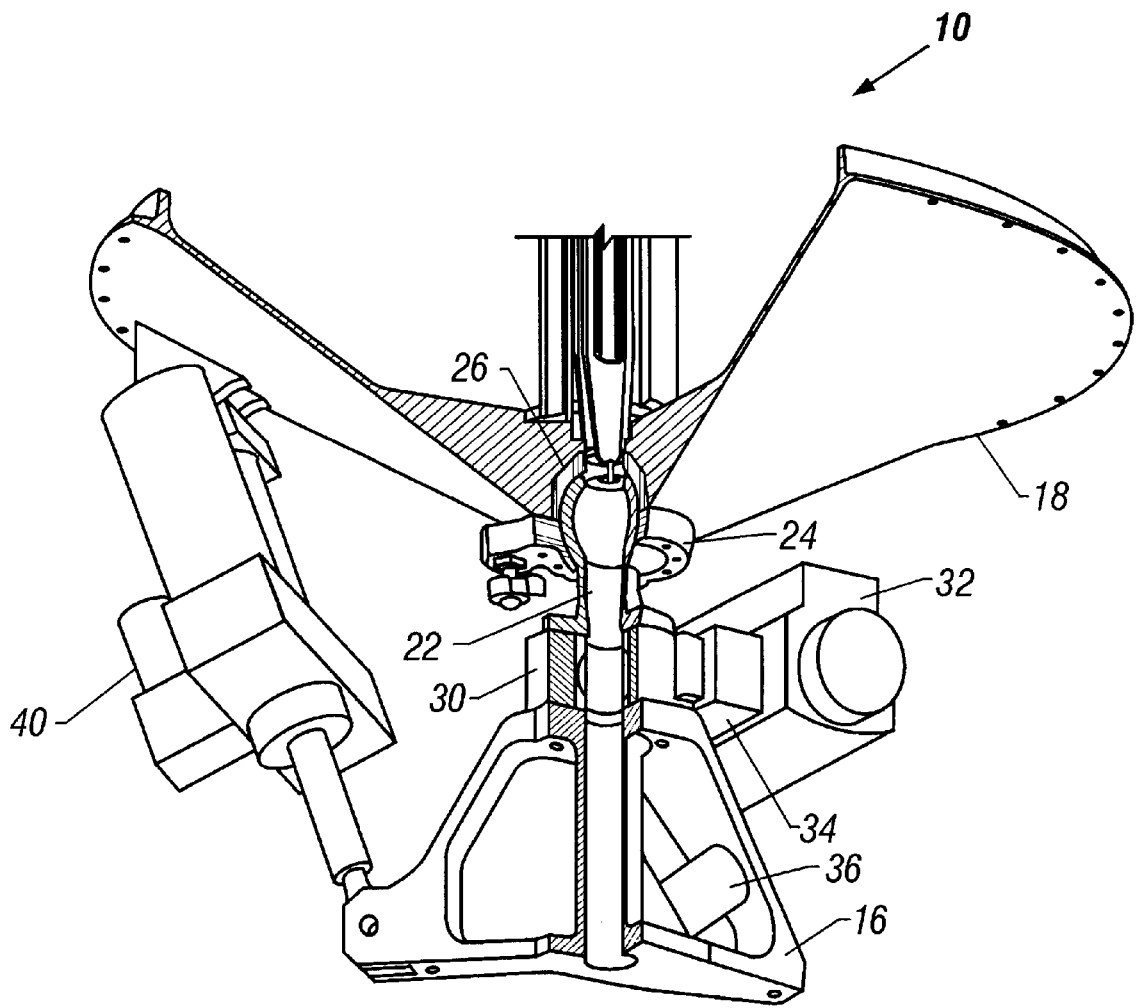
FIG. 2 is a cutaway perspective view illustrating the assembled apparatus of FIG. 1.
Figure 3:
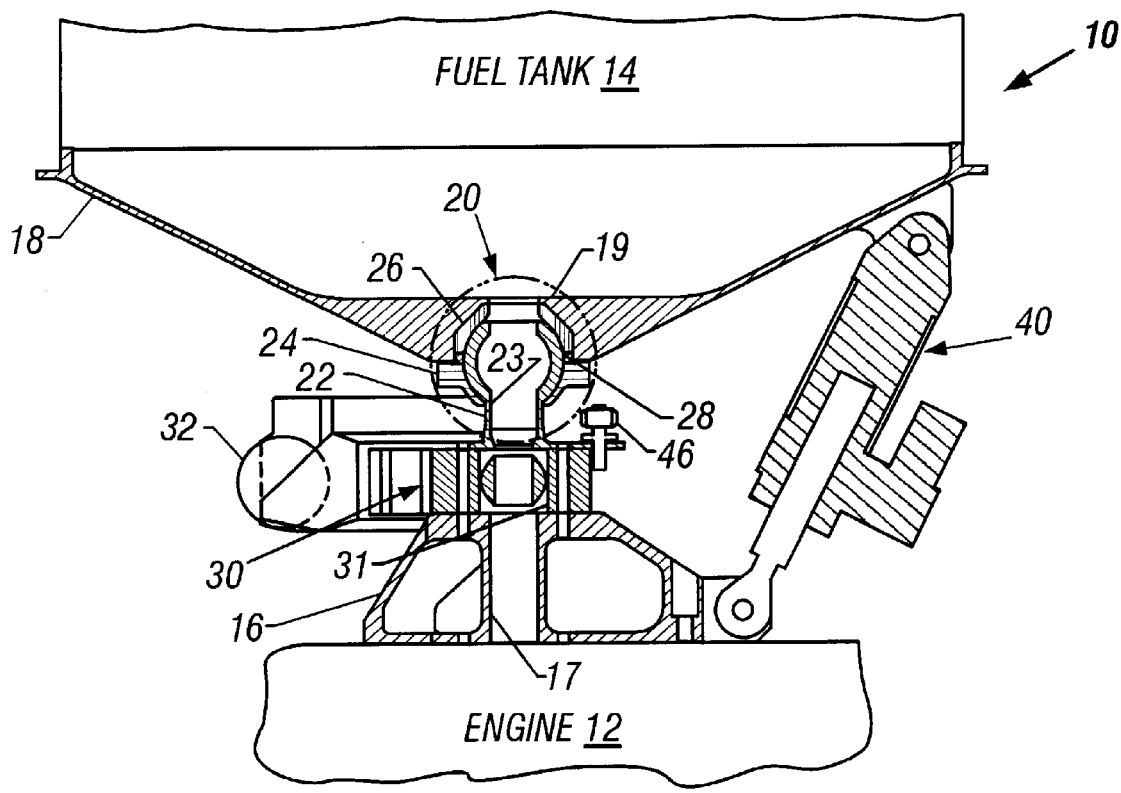
FIG. 3 is a partial cross-sectional view illustrating the assembled apparatus of FIG. 1.

As shown in FIGS. 1–4, the flow-through thrust takeout apparatus 10 is connected between the rocket engine 12 and the fuel tank 14 to provide thrust takeout and facilitate fuel flow. The apparatus 10 includes a coupler 16 for attachment with the engine 12. The coupler 16 is typically an injection manifold. A tank interface 18 is connected with the fuel tank 14. The coupler 16 includes a coupler passage 17, and the tank interface 18 includes an interface passage 19, as shown in FIG. 3.

Figure 4:
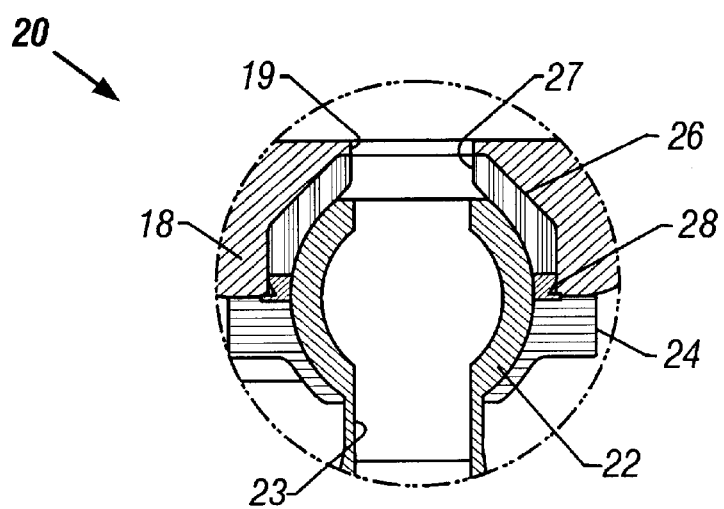
FIG. 4 is a cross-sectional view of the ball and socket joint in the assembled apparatus of FIG. 3.

As best seen in FIGS. 3 and 4, a ball and socket joint 20 is used to couple the tank interface 18 with the coupler 16. The ball and socket joint 20 includes a ball or ball line 22, and a ball clamp 24 which is attached to the tank interface 18 by fasteners or the like. The ball clamp 24 and interface 18 form a socket around the ball line 22 which is movable therein in a gimbal fashion. The ball line 22 has a generally spherical external surface portion, and a ball line passage 23 extending therethrough. The ball clamp 24 includes a generally spherical internal surface portion for contacting the spherical external surface portion of the ball line 22. In the embodiment shown, the ball clamp 24 is a generally annular member.

A socket bearing 26 is desirably provided between the tank interface 18 and the ball line 22, and includes a generally spherical internal surface for contacting the spherical external surface portion of the ball line 22. The bearing 26 is a generally annular member having an inner edge defining a bearing opening 27 fluidicly coupled with the ball line passage 23 and an outer edge spaced outwardly from the ball line passage 23. A seal 28 is desirably placed between the ball line 22 and the interface 18 to seal the ball and socket joint 20. The seal 28 may be an O-ring. In the embodiment shown in FIGS. 3 and 4, the seal 28 is disposed between the bearing 26 and the ball clamp 24.

The ball line 22 is attached to the coupler 16 by fasteners or the like. In the exemplary embodiment, a valve 30 is mounted between the ball line 22 and the coupler 16. The valve 30 has a valve passage 31 fluidicly coupled between the ball line passage 23 and the coupler passage 17. The valve 30 may be a ball valve as shown in FIGS. 2 and 3. The ball valve 30 is adjusted between a fully open and a fully closed position by a pneumatic actuator 32 connected to the valve 30 by a valve couple 34, as shown in FIGS. 1–3. Of course, other types of valves and valve controllers can be used instead. A fuel pressure transducer 36 may be provided to measure the fuel pressure at the injection manifold 16, as shown in FIGS. 1 and 2.

The apparatus 10 includes at least one and typically two actuators 40 coupled between the tank interface 18 and coupler 16. The actuators 40 are thrust vector control actuators that are actuatable to adjust the position of the engine 12 relative to the fuel tank 14 to accomplish thrust vector control of the system. The actuators 40 are typically linear actuators each having one end rotatably connected with the interface 18 and another end rotatably coupled with the coupler 16, as shown in FIGS. 1–3. In a specific embodiment, the two actuators 40 are spaced by 90°. The first actuator 40 is configured to adjust the angular position of the interface 18 relative to the coupler 16 along a first plane, and the second actuator 40 is configured to adjust the angular position along a second plane that is generally perpendicular to the first axis. The first and second planes typically are X and Y planes that are perpendicular to the Z axis along the tank or vehicle centerline.

As shown in FIGS. 1 and 3, an anti-rotate link 46 is desirably provided to prevent rotational movement or clocking movement between the tank interface 18 and coupler 16. The anti-rotate link 46 may be coupled between the interface 18 and the coupler 16. Alternatively, the anti-rotate link 46 may be coupled between a member that is attached to move with the tank interface 18 (e.g., the ball clamp 24) and a member that is attached to move with the coupler 16 (e.g., the valve 30 or ball line 22). The link 46 assures proper alignment of the thrust vector control actuators 40 in addition to eliminating clocking movement.

The ball and socket joint 20 transfers the engine thrust from the engine 12 to the fuel tank 14, and facilitates fuel flow from the fuel tank 14 to the engine 12. The ball line 22 transfers the engine load from the coupler 16 and valve 30 to the load bearing 26, and the ball line passage 23 is the primary conduit for fuel flow. The bearing 26 transfers the load from the ball line 22 to the tank interface 18, and can be used to apply assembly preload for achieving no play during articulation of the joint 20. The tank interface 18 transfers the load to the tank 14, and captivates the ball 22 for proper alignment in the bearing 26. The ball clamp 24 serves to affix the ball line 22 in the tank interface 18, and contributes to the alignment, preload, and sealing of the articulated ball and socket joint 20.

The bearing 26 is typically made of a non-metallic, low-fiction, high wear sealing material such as Viton™ that provides low-friction contact and primary sealing for the ball and socket joint 20. The seal 28 provides sealing for the fuel as it flows through the articulated joint 20, including the interface passage 19, the ball line passage 23, the valve passage 31, and the coupler passage 17, as shown in FIGS. 3 and 4. The seal 28 and the bearing 26 are desirably positioned to allow use of the fuel as lubricant on the bearing 26. In a specific embodiment, the bearing 26 is disposed with gaps between the interior surface of the bearing 26 and the exterior surface of the ball line 22 to permit fluid flow therethrough for lubrication. An example of a suitable seal 28 is an Omni™ seal made of Teflon™.

The flow-through thrust takeout apparatus 10 is compact and lower in weight, and has fewer parts than previous structures, thereby reducing manufacturing costs. The compact flow-through design decreases pressure drop of the fuel flowing therethrough. The apparatus 10 advantageously is adaptable to different design configurations.

The above-described arrangements of apparatus and methods are merely illustrative of applications of the principles of this invention and many other embodiments and modifications may be made without departing from the spirit and scope of the invention as defined in the claims. For instance, the valve 30 may be placed in a different location away from the ball and socket joint 20. Other ways of providing low-friction contact and for providing sealing between the ball and the socket may be used. The scope of the invention should, therefore, be determined not with reference to the above description, but instead should be determined with reference to the appended claims along with their full scope of equivalents.

What is claimed is:

1. A flow-through thrust takeout apparatus for thrust takeout between an engine and a structural body, the apparatus comprising:

a coupler to be coupled with the engine, the coupler having a coupler passage;

a ball line attached to the coupler and having a ball line passage fluidicly coupled with the coupler passage, the ball line having an exterior surface;

a ball clamp movably connected with the exterior surface of the ball line; and an interface member to be coupled with the structural body, the interface member attached to the ball clamp to be movable relative to the coupler and the ball line, the interface member having an interface passage fluidicly coupled with the ball line passage.

2. The apparatus of claim 1 further comprising at least one thrust vector control actuator coupled between the interface member and the coupler, the thrust vector control actuator actuatable to adjust a position of the interface member relative to the coupler.

3. The apparatus of claim 2 wherein the thrust vector control actuator comprises a linear actuator having one end rotatably connected with the interface member and another end rotatably connected with the coupler.

4. The apparatus of claim 2 comprising first and second thrust vector control actuators, the first thrust vector control actuator configured to adjust an angular position of the interface member relative to the coupler along a first axis, the second thrust vector control actuator configured to adjust an angular position of the interface member relative to the coupler along a second axis generally perpendicular to the first axis.

5. The apparatus of claim 1 wherein the engine comprises a rocket engine which is mounted to the coupler.

6. The apparatus of claim 1 wherein the structural body comprises a fuel tank which is connected to the interface member.

7. The apparatus of claim 1 further comprising a bearing disposed between and contacting the external surface of the ball line and the interface member.

8. The apparatus of claim 7 further comprising a seal disposed between the external surface of the ball line and the interface member to seal therebetween.

9. The apparatus of claim 8 wherein the bearing has a portion fluidicly coupled with the ball line passage, and wherein the seal is spaced from the ball line passage by the bearing.

10. The apparatus of claim 9 wherein the bearing comprises a curved annular body having an inner edge defining a bearing opening fluidicly coupled with the ball line passage and an outer edge spaced outwardly from the ball line passage, and wherein the seal comprises a ring-shaped body.

11. The apparatus of claim 10 wherein the seal is disposed between the bearing and the ball clamp.

12. The apparatus of claim 1 wherein the ball clamp comprises an annular body having a generally spherical inner surface portion movably connected to a generally spherical exterior surface portion of the ball line.

13. The apparatus of claim 1 further comprising an adjustable valve disposed between the interface passage and the coupler, the valve having a valve passage fluidicly coupled between the ball line passage and the coupler passage.

14. A flow-through load transfer apparatus for coupling between an engine and a tank, the apparatus comprising:
- a coupler to be coupled with the engine, the coupler having a coupler passage;
- a valve having a valve passage fluidicly coupled with the coupler passage;
- a ball having a ball passage extending therethrough, the ball passage being fluidicly coupled with the valve passage, the ball having an exterior surface; and
- a socket to be coupled with the tank, the socket having an interior surface movably coupled to the exterior surface of the ball.

15. The apparatus of claim 14 further comprising a bearing disposed between the exterior surface of the ball and the interior surface of the socket.

16. The apparatus of claim 15 further comprising an actuator operatively coupled with the valve for controlling the valve.

17. A flow-through load transfer apparatus for coupling between an engine and a tank, the apparatus comprising:
- a coupler to be coupled with the engine, the coupler having a coupler passage;
- a ball connected with the coupler and having a ball passage extending therethrough, the ball passage being fluidicly coupled with the coupler passage, the ball having an exterior surface;
- a socket to be coupled with the tank, the socket having an interior surface movably connected with the exterior surface of the ball, a portion of the interior surface of the socket being spaced from the exterior surface of the ball by a socket spacing; and
- a seal disposed in the socket spacing between the exterior surface of the ball and the inner surface of the socket.

18. The apparatus of claim 17 further comprising a bearing disposed in the socket spacing between the exterior surface of the ball and the interior surface of the socket.

19. The apparatus of claim 18 wherein the bearing is disposed between the seal and the ball passage.

20. The apparatus of claim 19 wherein the bearing is disposed with gaps between the interior surface of the bearing and the exterior surface of the ball to permit fluid flow therethrough for lubrication.

* * * * *